United States Patent [19]

Patzschke et al.

[11] 4,373,059

[45] Feb. 8, 1983

[54] PRE-CONDENSED, THERMOSETTING AQUEOUS VARNISH COATING AGENT AND ITS UTILIZATION FOR CATHODIC DEPOSITION UPON ELECTRICALLY CONDUCTING SURFACES

[75] Inventors: Hans-Peter Patzschke; Armin Göbel, both of Wuppertal, Fed. Rep. of Germany

[73] Assignee: Herberts Gesellschaft mit Beschrankter Haftung, Wuppertal, Fed. Rep. of Germany

[21] Appl. No.: 183,040

[22] Filed: Sep. 2, 1980

[30] Foreign Application Priority Data

Sep. 8, 1979 [DE] Fed. Rep. of Germany ....... 2936356

[51] Int. Cl.$^3$ .................. C08L 63/02; C08L 77/06; C08L 67/02
[52] U.S. Cl. .................. 524/761; 204/181 C; 524/765; 524/901; 525/107; 525/127; 525/128; 525/172; 525/423; 525/424; 525/425; 525/438; 525/440; 525/452; 525/454; 525/457; 525/526; 525/528; 525/533

[58] Field of Search .............. 525/438, 454, 528, 533, 525/107, 127, 128, 172, 424, 425, 440, 452, 457, 526; 204/181 C; 524/901, 761, 765

[56] References Cited

U.S. PATENT DOCUMENTS 4,072,770  2/1978  Ting ...................................... 525/454
4,101,497  7/1978  Charves et al. ...................... 525/454

*Primary Examiner*—Theodore E. Pertilla
*Attorney, Agent, or Firm*—Mandeville and Schweitzer

[57] ABSTRACT

The invention concerns a pre-condensed, thermosetting aqueous lacquer coating material containing a pre-condensation product that becomes water-dilutable after protonization with acids and has a mean molecular weight $[\overline{M}_n]$ of 800 to 15,000, obtainable by heating of 55 to 95% by weight, based on the total quantity of the binding agent, of an organic synthetic-resin binder containing primary and/or secondary amino groups which has an amine number of 30 to 150 and 5 to 45% by weight of a crosslinking agent possessing esterified terminal carboxyl groups.

The invention moreover concerns the application of this lacquer coating material for cathodic deposition upon electrically conducting surfaces.

17 Claims, No Drawings

PRE-CONDENSED, THERMOSETTING AQUEOUS VARNISH COATING AGENT AND ITS UTILIZATION FOR CATHODIC DEPOSITION UPON ELECTRICALLY CONDUCTING SURFACES

The object of the invention is a pre-condensed, thermosetting aqueous varnish coating agent, and the application thereof for cathodic deposition upon electrically conducting surfaces.

In European Patent Application No. 79 100 735.4 there are described cathodically depositable elctro-dipping lacquer binders, which eliminate alcohols and form amides during the baking-in process. The coating agent described in this patent application contains, as the binding medium, one or several amino-group-containing resins[s] [Component A], which contain[s] primary and-/or secondary-and if appropriate also tertiary-amino groups as well as amide-convertible cross-linking agents [Component B]. It has been observed that under certain circumstances precipitation phonomena and/or phase separations may occur upon prolonged standing of the electrodipping varnish bath which contains such binding agents. This unfavourable effect may be diminished, or may in many cases even be prevented, if the cross-linking agent [Component B] also contains amino groups within the molecule, as has already been described in the above-mentioned patent application.

The basis of the present invention is the objective of reducing or eliminating, by simple means, the risk of disadvantage of that kind. The invention is moreover based upon the task of finding a lacquer coating which may be applied by conventional processes for varnish application, which yields varnish coatings affording good anti-corrosion protection, and which releases the least possible quantity of elimination products and of organic solvents to the environment during the baking-in operation.

It has been found, surprisingly, that this problem may be solved in very simple manner by arranging that the varnish coating agents shall contain, as binding agent[s], pre-condensates of the above-specified components A and B.

Accordingly, an object of the present invention is a pre-condensed, thermosettable aqueous varnish coating agent containing a binding agent rendered water-dilutable by protonization which acids, pigments, fillers, corrosion inhibitors, varnish adjuvants, catalysts if appropriate, and organic solvents in quantity of up to 20% by weight referring to the total weight of the coating agent; and which is characterized by containing as the binding agent a pre-condensation product having a mean molecular weight $[M_n]$ of about 800 to 15,000, obtainable by heating of:
  A. a quantity of 55 to 95% by weight, referring to the total quantity of binder, or organic synthetic-resin binder containig primary and/or secondary— and if appropriate also tertiary-amino groups and showing an amine number of about 30 to 150, and
  B. a quantity of 5 to 45% by weight of cross-linking agent containing terminal carboxyl groups, the latter being esterified with monoalcohols in such proportion as will cause the pre-condensate to show an ester-number of at least about 30 and preferably of at least about 50, the ester groups being largely stable in a neutral aqueous medium yet being reactive towards the amino groups of the synthetic-resin binder A in a basic medium at temperatures above about 140° C.,
to temperatures between about 50° and 200° C. for such length of time that, after protonization with acid and dilution with water for the purpose of preparing a varnish, it shows no precipitation phenomena.

By terminal carboxyl groups are meant those carboxyl groups which occur at the end of a chain or at the ends of side-chains in branched molecules.

A further preferred object of the invention is the utilization of said coating agent for cathodic deposition from a lacquer bath on to electrically conducting surfaces.

The synthetic-resin binding agent [Component A] may conveniently be a polyamide, or a reaction product of epoxide-group-containing or isocyanate-group-containing compounds having a molecular weight greater than 300 with hydroxy-group-containing or amino-group-containing aldimines, ketimines or aliphatic polyamines in which generally all of the epoxide groups and isocyanate groups have each been reacted with one molecule of aldimine, of ketimine or of diamine.

The cross-linking agent [Component B] may conveniently be a polyester, or a reaction product of epoxide-group-containing or isocyanate-group-containing compounds having a molecular weight greater than 300 with hydroxy- and/or aminoalkyl esters or with acidic polycarboxylic acid esters. Component B usefully contains 2 to 6 terminal carboxyl groups which are at least partially esterified.

Component A, containing reactive primary and/or secondary amino groups, is prepared with a mean molecular weight $[M_n]$ of from about 500 to 10000, preferably from about 700 to 8000 and almost preferably from around 800 to 5000. The appropriate mean molecular weight may also be procured by mixing of two resins of that kind, of which the one comprises a higher molecular weight and the other a lower molecular weight. In order to attain a suitable solubility in water it is preferred that the binding agent should possess an amine number of from about 30 to 150 but preferably one of about 60 to 130 and most preferably one of around 80 to 120. The proportion of primary and/or secondary amino groups should be at least around one-third of the total number of amino groups, i.e. the reactive amine number should be above 30 and preferably above 50. The amine number may also be procured by mixing of two suitable resins, of which the one comprises a high amine number and the other a lower amine number. An effort is made to keep the proportion of tertiary amino groups present in the molecule as low as possible and the proportion of secondary and/or of especially advantageous primary amino groups as high as possible. The amines utilized for preparation of the component A will expediently have a $pK_b$-value of about 2.5 to 9.0, particularly one between 2.8 and 7.0 and especially usefully one between 3.0 and 5.5.

The introduction of primary and/or secondary amino groups into the parent resin to prepare the component A, is conveniently accomplished by reaction of resins containing more than one epoxide group or isocyanate group per molecule-preferably at least two epoxide groups or isocyanate groups per molecule-with an amino- and/or hydroxyl-group-containing ketimine or aldimine and/or, for particular preference, with a polyamine. The 1,2-epoxide-group-containing resins prove to be especially suitable for this reaction; these are prepared by:

a. introduction of glycidyl groups in an alkaline medium using e.g. epichlorhydrin:
   aa. into OH-functional resins such as Epoxy-Novolacs (registered trademark) to give polyglycidyl ethers,
   ab. into COOH-functional resins to give polyglycidyl esters, or
   ac. into NH₂-functional resins to give polyglycidyl amines;
b. internal polymerization of glycidyl[meth]acrylate with a suitable monomer mixture of e.g. styrene and/or [meth]acrylic acid esters having various chain lengths and/or hydroxyalkyl(meth)acrylates.

It is particularly preferable with respect to (a) that the 1,2-epoxide-group-containing resins shall be polyglycidyl ethers of the general formula

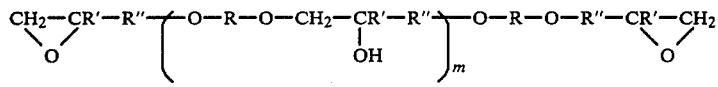

wherein

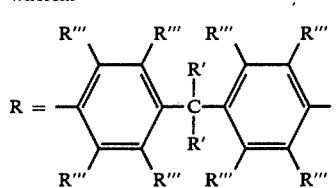

$R' =$ hydrogen or $-C_nH_{2n+1}$
$R'' = -(CR'_2)_n-$
$R''' = R'$ or halogen, preferably hydrogen
$m = 0$ to $3$
$n = 1$ to $3$
with a mean molecular weight $(\overline{M_n})$ of about 300 to 2000 and with an epoxy-equivalent weight of about 170 to 1500. Such resins are reaction products of epichlorhydrin with dioxydiphenylmethane (bis-phenol F) or with dioxydiphenylpropane (bis-phenol A), and they may also be used in the hydrogenated form.

In order to diminish the functionality, or to lengthen the chain and thus to raise the molecular weight, the preferred polyglycidyl ethers may be reacted with compounds that contain reactive hydrogen. Such compounds possess, for example, carboxyl groups, hydroxyl groups or primary and secondary amino groups. Preferred chain-limiting agents are dimethylpropionic acid, iso-palmitic acid, versatic acid, diethylamine, di-(2-ethylhexyl)amine, diethanolamine and/or linear, branched, saturated or unsaturated mono-alcohols of various chain lengths. Preferred chainlengthening agents are organic polyalcohols such as 1,6-hexanediol or dioxydiphenylpropane, especially polymeric polyols such as polyoxyalkylene glycols or polyether polyols and/or diamines with secondary amino groups such as the reaction product of 1,6-hexanediamine with two mole of glycidyl ether or of the glycidyl esters of α-branched fatty acids.

The dispersability is improved by incorporation of tertiary amino groups into the molecular chain, since the quaternary ammonium salts which arise from salt-formation are distributed over the whole molecule and do not only occur at the end of the molecule. Epoxidized polyglycidyl ethers may also contain other basic components such as triglycidyl-isocyanurate, heterocyclic diglycidyl compounds (DE-OS 18 16 095), substituted hydantoins (U.S. Pat. Ser. No. 3,391,097), dicyclopentadiene-diepoxide or 1-epoxyethyl-3,4-epoxycyclohexane.

Epoxide-group-contaning resins with a mean molecular weight $(\overline{M_n})$ of from about 500 to 10000 but especially of from about 800 to 5000 are prepared by copolymerization of glycidyl-(meth)acrylate with other unsaturated monomers. The epoxy-equivalent-weight is from about 300 to 5000 and in particular from about 500 to 2000. Unsaturated monomers are, e.g., styrene, vinyltoluene, α-methylstyrene and/or (meth)acrylic acid esters of various chain lengths, where the methacrylic acid esters preferably contain linear or branched aliphatic $C_1$-to $C_4$-alcohols and the acrylic acid esters preferably contain linear or branched aliphatic, cycloaliphatic or aromatic $C_1$- to $C_8$-alcohols. If appropriate, hydroxyl-group-containing monomers such as hydroxyalkyl-(meth)acrylic acid esters, e.g. 2-hydroxypropylmethacrylate, 1,4-butanediol-monoacrylate or hydroxyethyl acrylate, or etherified methylol derivatives of (meth)acrylamide, may be used as additional components.

The interpolymerization takes place in organic solvents such as alcohols or glycol ethers at about 60° to 145° C., with the addition of radical initiators such as peroxides, hydroperoxides, per-esters or thermally fissionable azo-compounds. The reaction conditions (reaction temperature, choice of solvent) must be so held that no substances-like water-which decompose the ketimine bonding an/or aldimine bonding remain present in the reaction product. Resin bases which consist of aromatic, aliphatic and/or cycloaliphatic skeleton structures with at least two isocyanate groups per molecule are suitable as isocyanate-group-containing polymers. Typical examples are the isomers, or mixtures of isomers, of toluylene di-isocyanate, of 4,4'-diphenylmethane-di-isocyanate, and also hydrogenation products of these such as dicyclohexylmethane-di-isocyanate. Also applicable are hexane-1,6-di-isocyanate, 1,6-diisocyanato2,2,4-trimethylhexane and 1-isocyanatomethyl-3-isocyanato-1,5,5-trimethylcyclohexane. Particular preference is given in this context to higher-functional polyisocyanates, which arise through trimerization, decomposition with water, and reaction with polyalcohols such as trimethylol propane, triethyl isocyanurate, or amino-group-containing or ketimine-group-containing polyols. Products of that kind are offered commercially, e.g. triphenylmethane-4,4',4''-tri-isocyanate (Desmodur R), the biuret from hexamethylene di-isocyanate and water (Desmodur N) or the adduct from toluylene di-isocyanate and trimethylol propane (Desmodur L). Chain limiting or lengthening may here also be procured-depending on the functionalityby reaction with compounds which contain reactive hydrogen, whereupon amide-, urethane- or urea-linkages arise. Examples of such compounds are dodecyl alcohol, dimethyl-aminoethanol, di-(2-ethylhexyl)amine, 1,6-hexanediol, N-methyldiethanolamine, or the reaction product of 1,6-hexanediamine with 2 mole of glycidyl ether or of the glycidyl esters of α-branched fatty acids. Suitable isocyanate-containing pre-polymers are also prepared, possibly with the addition of catalysts such as dibutyl-tin dilaurate or tertiary amines, by reaction of polyglycol ethers, polyester polyols, polyether polyols, polycaprolactone polyols, polycaprolactam polyols or polyaminoamides with excess of polyisocyanates at temperatures of about 30° to 100° C. Introduction of primary amino groups into isocyanate-containing and epoxide-group-containing resins is accomplished by stoichiometric addition of ketimines and/or aldimines or by reaction with excess quantities of polyamines. For the ketimines or aldimines there are used, respectively, hydroxyl-group-containing or amino-group-containing linear, branched or cyclic alkylketimines or alkylaldimines, for example products having the following structure(s):

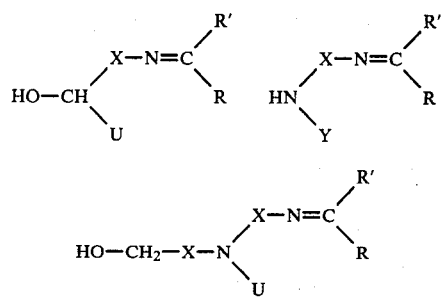

where

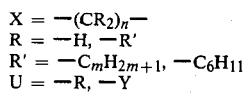

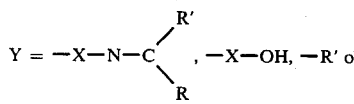

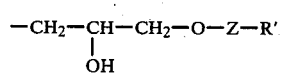

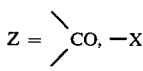

n = 1 to 6
m = 1 to 12

The ketimines or aldimines are prepared according to known methods by elimination of water from the appropriate polyamines of the general structure R-NH-R-NH$_2$ or the appropriate amino-alcohols of the general structure HO-R-NH$_2$ and the appropriate aliphatic ketones such as diethylketone, methyl isobutyl ketone, ethyl n-propyl ketone, or even cyclopentanone, cyclohexanone, acetophenone, etc. or aldehydes like isobutyraldehyde. The use of ketimines is preferred. In order to facilitate ketimine formation, preference is given to those ketones which permit the water of reaction to be removed from the system in a simple manner and in which the substituents exert the least possible steric hindrance effect. The amines used for preference are diethylene triamine, N-methyl-ethylenediamine, N-methyl-propylene- diamine, N-aminoethyl-piperazine: among the amino-alcohols, 2-aminoethanol is preferred in use.

By virtue of the ketimine formation or aldimine formation, the primary amino group becomes so protected (cf. U.S. Pat. No. 3,523,925) that it may without difficulties be reacted through a further functional group—e.g. a secondary amino group or a hydroxyl group—with the epoxide base-resin to yield the component A. The protective group is readily split off again upon solution in water. This operation is expediently carried out only after the pre-condensation. Under the definition "primary amino groups" for the component A are also to be understood those amino groups which are protected by ketimine—or aldimine-groups. The choice of molar proportions of the components used must be such as will guarantee that no unreacted amine of low molecular mass remains over in the reaction batch, because otherwise puncture-like surface defects will arise during the electrophoretic coating process. The preferential reaction of the secondary amino group of the polyaminoketimine with the epoxide group commences even at room temperature, and is generally exothermic.

As a rule it is necessary to raise the temperature to between 50° and 120° C. from time to time, in order to achieve a complete reaction.

Reaction of the hydroxyl-group-containing ketimines with epoxide groups occurs at about 100° to 150° C., and the temperature may be lowered by the addition of basic catalysts such as tertiary amines, e.g. N,N-dimethyl benzylamine, or of Friedel-Crafts catalysts such as boron trifluoride or tin(II) chloride. The reaction conditions (temperature, choice of solvent, working in absence of water) are so selected that no decomposition of the ketimine group occurs. In the preparation of products having low viscosity it is often useful to pre-prepare the ketimine solution and to add the base-resin slowly. Secondary hydroxyl groups are formed at the epoxide resin by the reaction of bis-phenol-based polyglycidyl ethers with amino- and/or hydroxyl-group-containing alkylketimines. If primary hydroxyl groups are to be produced, then either a reaction with amino-alcohols has to be carried out or else the appropriate hydroxyl group must be prepared by hydrolytic decomposition by way of the corresponding esters. Those monocarboxylic acids of low molecular mass—e.g. lactic acid—which are here used primarily for esterification serve at the same time as neutralizing agents after the hydrolysis. Another known form of procedure for the preparation of resins with primary and/or secondary amino groups is the reaction with lower aliphatic linear or branched C$_2$- to C$_6$-alkylene-diamines or polyalkylenediamines; these are particularly appropriate when the reaction temperature required for the addition, esterification or ester-interchange needs to be so high that the ketimines become decomposed or that other interfering side-reactions prevent the utilization of ketimines. Primary amines are bifunctional and might lead to gelling of the reaction mixture; therefore it becomes necessary to take precautions against gelling when they are utilized. So, for example, the process may be carried out with an excess of amine, and after termination of the reaction the excess of amine may be distilled off in vacuo. Moreover, the reaction conditions may be so varied that the epoxide-group-containing material is added into the excess of amine. The same state of affairs must be taken into consideration when polyamines such as ethylene diamine are used.

Thus, for example, epoxide-group-containing resins from polyhydrocarbons containing olefinic double bonds, having a mean molecular weight [$\overline{M}_n$] of 750 to 6000 and an epoxy-equivalent-weight of 500 to 2000, are reacted at temperatures of about 120° to 200° C. with excess of ethylene diamine or of diethylene triamine, and the excess amine is distilled off in vacuo. Examples of hydrocarbon resins containing olefinic double bonds are polybutadiene oils of varying steric configurations(s), co-polymers of butadiene with other unsaturated monomers such as styrene, or liquid polypentadiene. They are epoxidized by reaction with per-acids such as performic acid or peracetic acid.

On the other hand, the more reactive polyglycidyl ethers based on bis-phenol A react even at room temperature. In order to avoid gelling phenomena, firstly the process is carried out with 1.1 to 8 mol of polyamine per epoxy-equivalent and preferably with 2 to 6 mol excess of polyamine, and secondly the epoxide resin is added into the pre-prepared polyamine. The epoxide resin may be sprinkled in as a pulverized solid, or it may be slowly added in the form of a solution in an organic solvent such as e.g. xylene or xylene/butanol. The solvent and the excess of amine must subsequently be very carefully distilled off, under vacuum and with exclusion of oxygen, and may be re-used for the next reaction batch.

Polyaminoamides or amino-group-containing polyamides are prepared from lower aliphatic linear or branched polyamines and/or aminoalcohols, in admixture with polyalcohols if appropriate, with polybasic carboxylic acids and/or their anyhydrides. As the lower aliphatic polyamines and/or aminoalcohols which shall preferably be used in stoichiometric excess - there can be utilized e.g. lower aliphatic polyamines such as ethylene diamine or diethylene triamine or aminoalcohols or mixtures thereof with polybasic acids such as dimerized fatty acid, if appropriate with addition of suitable low-molecular weight polyols like neopentyl-glycol or polyglycol ethers or of higher polymeric polyols such as polyester polyols, polyether polyols, or polycaprolactone polyols. The formulation of suitable amine numbers in accordance with the molecular-weight range is accomplished by addition of suitable chain-breaking agents such as saturated or unsaturated monocarboxylic acids, mono-alcohols or monoamines. The condensation is carried out in the customary manner in the fused mass or as an azeotropic condensation at temperatures of approximately 150° to 250° C. Similar products are prepared on the manufacturing scale under the trade names 'Bexoprox', 'Versamid' and 'Merginamid'.

Such polyaminoamides may also be prepared by ester-interchange of ester-group-containing condensation resins with polyamines or even amino-group-containing alkylketimines, with elimination of low-boiling alcohols such as methanol or ethanol, and in the presence of ester-exchange catalysts if appropriate.

The cross-linking agent (Component B) is a resin which is capable of engaging in amidation reactions with resins that contain primary and/or secondary amino groups. Such processes occur preferentially with terminal esterified carboxyl groups which are largely stable in a neutral aqueous medium, but which react with the synthetic-resin binder (Component A) containing primary and/or secondary amino groups in the basic medium of the deposited film at temperatures above approximately 140° C. and particularly about 160° C.

The cross-linking agent contains about 2 to 6 terminally esterified carboxyl groups per molecule. The density of cross-linking must be adjusted to suit the desired properties of the film. The resistance toward organic solvents like methyl ethyl ketone diminishes with a decreasing number of esterified carboxyl groups. If less than two groups are present in the molecule, then cross-linking no longer occurs at all. If the number of cross-linking points per molecule becomes too great, then development of the process becomes impaired and there occurs the risk that a brittle film will be produced. The carboxyl group may be esterified with short-chain and/or long-chain linear and/or branched $C_1$ to $C_{18}$, but preferably $C_1$ to $C_6$, mono-alcohols.

The volatility of the alcohol which is eliminated should be high enough that it is removed from the film at the baking-in temperatures to be used in thin layers.

In the main, all terminal carboxyl groups shall be esterified with alcohols having a boiling point below 280° C. but preferably below 180° C. and most preferably below 140° C.

In order to prevent migration of the component B to the anode, attention must be paid to ensure that more than 80 equivalent-percent of the terminal carboxyl groups, but preferably 90 and most preferably 95 equivalent-percent-i.e. substantially all of the terminal carboxyl groups—are esterfied. In order to achieve a satisfactory reaction, it is necessary to have a proportion of eliminatable high-boiling materials in the film. On the other hand, the reactivity of the esters is increased by the application of low-boiling primary alcohols—for preference lower aliphatic alcohols—such as methanol or ethanol, and by enhancement of the electrophilic activity of the carboxyl group through suitable substituents. The incorporation of methyl- and/or ethyl-ester(s) of lactic acid and of monomethyl- and/or monoethyl ester(s) of succininc acid has proved to be particularly satisfactory. The limit for the number of ester groups is set by the synthetically feasible molecular structure; conveniently it is no greater than about 370, in particular no greater than about 250 and for preference at a maximum of 180. The lower limit is preferably around 70. The ester number denotes the quantity, in mg of KOH, that is equivalent to the quantity of alcohol which is contained in 1 gram of solid substance and which can be eliminated by amide-exchange during the thermal cross-linking process. In order to promote compatibility, the component B may comprise an amine number of between 0 and 100, preferably between 10 and 60. The mean molecular weight [$\overline{M}_n$] of the component B shall preferably be about 500 to 3000.

Such cross-linking agents can be prepared by various routes; however, on account of the gentle reaction conditions and the low degree of 'yellowing' of the products associated therewith, an especially useful synthetic route has proved to be the addition of hydroxy- and/or aminoalkyl-carboxylic acid esters or of dicarboxylic acid monoalkyl esters to molecules with isocyanate- or epoxide-groups. Especially preferred is the addition of hydroxy- and/or aminoalkyl-carboxylic acid esters to aliphatic, cycloaliphatic and/or aromatic polyisocyanates with at least two isocyanate groups per molecule. Here those polyisocyanates described in more detail above may be utilized; a special case is the use of ester-group-containing di-isocyanates such as e.g. 2,6-di-isocyanato-methyl-capronate (lysin-di-isocyanate methyl ester). However, preference is given to polyisocyanates with more than two isocyanate groups, such as may be prepared by means of the reactions described in more detail above. The presence of basic amino groups in the molecule is frequently desired, in order to achieve improve stability of the bath. These groups are introduced by interlinking of two or of several polyisocyanates with aminoalcohols. For the aminoalcohols, preference is accorded to amino-group-containing polyols such as ethanolamine, N-methyl diethanolamine or triethanolamine or ketimine-group-containing polyols, which are prepared by condensation of 2-amino-2-ethyl-1,3-propane diol, (N-(2-hydroxyethyl)-ethylenediamine or N,N-bis-(2-hydroxyethyl)-ethylenediamine with ketones such as methyl isobutyl ketone.

The polyisocyanate is mixed with hydroxycarboxylic acid esters or with aminocarboxylic acid esters in stoichiometric quantitative proportions at temperatures of about 30° to 50° C., in order to take account of the exothermal effect. Thereafter it is permissible to go to temperatures of up to approx. 100° C., preferably of up to 80° C., in order to complete the reaction. In order to avoid uncontrolled reaction of the isocyanate group, the process is performed in absence of moisture and of atmospheric oxygen, and the functionality of the polyisocyanate is reduced by first carrying out the reaction with the hydroxyalkyl- and or aminoalkyl-carboxylic acid esters and then accomplishing the interlinking of the remaining isocyanate groups by way of an amino-group-containing polyalcohol. An alternative working procedure that has proved satisfactory also is the slow addition of the polyisocyanate into the pre-prepared solution of hydroxyalkyl- and/or aminoalkyl-carboxylic acid ester and amino-group-containing polyalcohol in a low-boiling inert solvent, such as acetic acid ester, which is later distilled off. To reduce the reactivity and at the same time to ensure elasticity small proportions of the aminoalkyl- and/or hydroxyalkyl-carboxylic acid ester may be exchanged, mol for mol, with longer-chain amines such as e.g. di-(2-ethyl-hexyl)amine or with alcohols, e.g. ethylhexanol. Examples of compounds used as the hydroxycarboxylic acid ester are dimethylol propionic acid methyl ester, lactic acid ethyl ester, hydroxyacetic acid butyl ester, oxybutyric acid ester, mandelic acid ethyl ester and salicylic acid methyl ester. Sarcosinic acid ethyl ester or anthranilic acid methyl ester may, for example be utilized as the aminocarboxylic acid ester.

Those epoxide-group-containing resins described further in the above text, where at least two and preferably more than two epoxy groups should be present in the molecule, are suitable to be utilized as polyepoxide resins for the especially preferred reaction with aminoalkyl carboxylic acid esters and/or with dicarboxylic acid monoalkyl esters. The monoesters are prepared from saturated or unsaturated dicarboxylic acid anhydrides, such as maleic acid anhydride or succinic acid anhydride or tetrahydrophthalic acid anhydride, and $C_1$ to $C_6$ linear or branched saturated or unsaturated mono-alcohols, preferably methanol and/or ethanol. A slight excess of the alcohol increases the stability of the monoester. In order to avoid ester-exchange reactions, the reaction temperature should if possible be kept below 120° C. and preferably below 100° C. not only during the preparative process but also during addition to the epoxide resin. Amino groups are best introduced by incorporation of a proportion of secondary monoamines such as diethylamine, N-methyl ethanolamine or diethanolamine; alternatively two or more epoxide resin molecules are linked to secondary amino groups by way of primary amines such as n-butylamine, monoethanolamine or glycine alkyl ester, or by way of diamines.

A variant of this procedure is the polycondensation of acidic polycarboxylic acid alkyl esters with, preponderantly, monoepoxide compounds. In the preparation of these products it is preferable to utilize a two-stage procedure.

1. Reaction of polycarboxylic acid anhydrides with hydroxyalkyl carboxylic acid esters at temperatures of about 120° to 240° C., preferably of 160° to 200° C., until all the anhydride groups have reacted. It is expedient to use 1 to 1.3 'Val' of hydroxyalkyl carboxylic acid ester per 'Val' of anhydride. The reaction may be catalyzed by means of basic catalysts such as tertiary amines. In particular, lactic acid ethyl ester, lactic acid propyl ester or dimethylolpropionic acid methyl ester are used as the hydroxylalkyl carboxylic acid ester. Examples of the polycarboxylic acid anhydrides are trimellitic acid anhydride, pyromellitic acid di-anhydride or corresponding hydrogenated ring systems; as well as cyclopentane tetracarboxylic acid di-anhydride, pyrazine tetracarboxylic acid anhydride, butane tetracarboxylic acid di-anhydride, bis-anhydride anystems, such as are described in the DE-OS-28 11 913; or even anhydride-group-containing copolymers such as maleic acid anhydride compolymers or ester-exchange products of vinyl acetate copolymers with trimellitic acid anhydride.

2. Preparation of the methyl-ester-group containing polyester by reaction of the acidic polycarboxylic acid alkyl ester with, predominantly, mono-epoxide compounds at temperatures of 100° to 240° C., preferably of 120° to 200° C., until an acid number of below 10 and preferably below 5 is attained. The quantitative proportions used correspond to about 0.5 to 1 'Val' of epoxide compound per free carboxyl group. Monoalkyl glycidyl ethers like butyl glycidyl ether, or monoalkyl glycidyl esters such as the glycidyl ester or versatic acid, are regarded as mono-epoxide compounds. Appropriate monofunctional components may also be prepared by defunctionalization of bis-phenol A-based polyglycidyl ethers or of epoxidized olefines, such as 1-epoxyethyl-3,4-epoxycyclohexane or dicyclopentenyl di-epoxide with monoamines, alcohols or organic acids. Also the polycarboxylic acid anhydrides may be completely esterified and be subsequently incorporated into the base-resin by means of an ester-exchange or amide-interchange reaction.

The various types of amino-group-containing base-resin (Component A) may be utilized either singly or else as a mixture of several resins with the associated cross-linking agent (Component B). For example, it may be necessary, in the interests of achieving suitable mechanical and electrical properties, to utilize an amino-group-containing epoxide resin together with a polyaminoamide resin. The mixture of these concentrates—which may, if appropriate, be diluted with organic solvents—is warmed, optionally after addition of a little water, with stirring and under inert gas, to temperatures of 50° to 200° C. (preferably of 80° to 150° C.) until the compounds have become mutually compatible after dilution. This pre-condensation procures to a certain extent an interlinking of the components A and B.

Progress of the reaction may readily be observed by following the change of viscosity in the condensation reaction. Viscosities of 0.5 to 10 Pa s, preferably of between 1 and 5 Pa s, are measured at 25° C. after dilution to 50% by weight with monobutyl glycol ether. Conveniently the reaction times are at least about 1 hour and, as a rule, not above 5 hours. Heating is normally carried out in a 50 to 95 percent-by-weight, preferably 75 to 90 percent-by-weight, solution in organic solvents, preferably in linear or branched aliphatic alcohols with 1 to 6 (usefully 2 to 4) C-atoms, especially in secondary alcohols or their monoglycol ethers. If the pre-condensation goes too far, then there occurs at first an impairment of the flow character in the film, and later on a gelling phenomenon in the reaction batch. The mixing ratio is so selected that the sum of the equivalents of primary and/or secondary amino groups of the component A bears to the equivalents of the esterified carboxyl groups of the component B a ratio in the range of about 1:5 to 1:0.1 and preferably of between 1:1 and 1:0.3. It is particularly to be preferred that a stoichiometric equivalence ratio be aimed at. To suitably adjust the application-related properties, it is also possible to co-emulsify or to co-condense into the cathodically depositable binding agents small quantities of yet other modifying resins, apart from the cross-linking agents already described. The following may serve as modifying resins of that kind: maleinate resins, styrene/allyl alcohol copolymers, OH-group-containing Epikote esters, blocked isocyanates, and also amine- and phenol-formaldehyde-resins. In order to avoid precipitation phenomena, the quantities co-emulsified should not exceed 20% by weight and should preferably be less than 10% by weight, and to improve the emulsifiability there should be present either a higher OH-number of about 100 to 250 or else a lesser proportion of basic amino groups (amine number below about 60, preferably below 40).

Solubility in water is attained by salt-formulation of the amino-group-containing resins with acidic compounds. Examples of suitable acids are: phosphoric acid, hydrochloric acid, acetic acid, lactic acid, malonic acid, citric acid, formic acid, acrylic acid, etc. Water-dilutable cationic resins, to serve as binding agents, may be prepared by addition to the basic resin about 0.2 to 1.0 'Val' (preferably 0.3 to 0.8 'Val')—referring to the basic nitrogen atom in the resin—of the protonizing acid, and thoroughly stirring the mixture at temperatures of about 20° to 90° C. Interfering solvents entrained in the preparation of the resins are distilled off in vacuo, e.g. during removal of the excess of polyamine or after hydrolytic decomposition of the ketimine. The coating agent may contain up to about 20% by weight of organic solvents, in order to reduce the viscosity, to control the deposition voltage and to improve the flow characteristics. Here it is permissible to utilize water-soluble solvents such as alcohols, glycol ethers, keto-alcohols, or small proportions of water-insoluble solvents such as hydrocarbons of different chain lengths. An organic solvent content which is as low as possible is to be aimed at, i.e. particularly a content below 15% by weight and most particularly a content of below 10% by weight.

The solids content of the lacquer in which the coating agent according to the invention is contained in diluted form is governed by the method of application in each case. Solids contents of about 30 to 60% by weight are suitable for dipping without application of an electrical potential or for spraying. For cathodic deposition from a lacquer bath on to electrically conducting surfaces the solids content may usefully be 5 to 30% by weight, preferably 10 to 20% by weight after dilution with water. The pH-value of the lacquer lies generally between about 5.0 and 7.5, preferably between 6.0 and 7.0. Electrophoretic deposition is conveniently carried out not earlier than 24 hour after preparation of the bath. During that time it is useful to stir continuously so as to achieve uniform distribution. Electrically conducting, non-corrodable electrodes—e.g. of stainless steel or graphite—are used as anodes. The object to be cathodically coated and the anode are dipped into an aqueous bath, in the manner well known in regard to electrophoretic deposition. The bath is conveniently maintained at temperatures between about 20° and 35° C. during the deposition process. Solids content deposition temperature and deposition time as well as the voltage are so selected that the desired layer thickness is obtained after rinsing down and baking-in.

Hardening is accomplished by baking at about 140° to 210° C., preferably 160° to 180° C., for a period of between 15 minutes and 1 hour. The baking temperature may be lowered, or completion of reaction may be hastened, by incorporation of e.g. 0.05 to 3% by weight of ester-exchange catalysts. Typical catalysts that may be used are: ammonium compounds such as benzyl trimethylammonium hydroxide, organic tin compounds such as dibutyl-tin dilaurate, titanium complexes like butyl titanate or triethanolamine titanate, iron-(III)acetylacetonate, chromium(III)acetylacetonate, zinc acetate, lead octoate, cerium(III)acetate, antimony trioxide or cobalt naphthenate.

The concentrated coating agent, which is to be diluted with water according to the invention has for example a solids content of about 85 to 50% by weight and may be pigmented in the customary manner by means of a ball mill, three-roller mill or sand mill. For pigmentation there may be utilized the customary pigments, fillers, anti-corrosion inhibitors and lacquer adjuvants such as anti-foaming agents, as long as these do not enter into undesirable reactions with water at a pH-value between acid and neutral, nor bring in any water-soluble foreign ions, nor become precipitated during aging in a form that cannot be stirred into solution again. The lacquers are especially well suited for electro-dip lacquering of metals; after baking for 30 minutes at 180° C. they furnish smooth, brilliant and hard films having good adhesion properties and elasticity as well as especially good corrosion resistance. The pigment/binding agent ratio depends upon the viscosity of the binder; in general it lies between 0.1:1 and 1.1:1

Base-resin A 1 (Component A):

A quantity of 0.8 g of triphenyl phosphine, 182.8 g of versatic acid 10, and 3703 of polyglycidyl ether based upon bis-phenol A with an epoxy-equivalent-weight of 606 are cautiously fused under nitrogen, and the melt is held—with stirring—at 120° to 130° C. until the acid number has become reduced almost to zero. The cooled resin is pulverized.

Epoxy-equivalent-weight: 800

Into a solution of 575 g of xylene and 352 g of ethylene diamine warmed to 80° C. is sprinkled 1725 g of the powdered resin during about 2 to 3 hours, with thorough stirring. Heating at 80° C. is continued for another hour, and then all the solvent and the excess of amine is carefully distilled off under reduced pressure and with increasing temperature. Dilution is carried out with monobutyl glycol ether and secondary butanol (1:3) to procure a solids content of 76.1% by weight.

Amine number: 98 mg KOH/g of solid resin

Viscosity: 2.1 Pa s (after dilution to 50% by weight with monobutyl glycol ether, at 25° C.)

Base-resin A 2:

Commercially available polyaminoamide resin based upon dimerized fatty acids and ethylene diamine, with an amine number of 90, and having a viscosity of 0.86 Pa s measured at 25° C. after dilution to 50% by weight with monobutyl glycol ether.

Base-resin A 3:

A quantity of 800 g of methyl isobutyl ketone is heated to 120° C. under inert gas. A mixture consisting of 1444 g of n-butyl acrylate, 764 g of styrene, 380 g of glycidyl methacrylate, 924 g of hydroxypropyl methacrylate, 80 g of azo-bis-isobutyronitrile, 400 g of methyl isobutyl ketone and 4 g of triphenylphosphine is added dropwise during a period of 3 hours, whereupon the temperature rises to 130° C. Thereafter, 20 g of azo-bis-isobutyronitrile is slurried with a little acetone and is added to the mixture; the mixture is held under reflux for a further 2 hours, whereby removal from the system of water residues is procured. After cooling to 80° C., 802 g of 57% solution of methyl-aminopropylamine monoisobutyl-ketimine in methyl isobutyl ketone is added during about 10 minutes, and the temperature is maintained at 80° C. for a further 2 hours. A quantity of 32 g of diethylamine is then added. After 30 minutes at 80° C., the methyl isobutyl ketone is distilled off and the product is diluted with 992 g of monobutyl glycol ether.

Solids: 73.5% by weight (40 min. at 180° C.)

Viscosity: 3.85 Pa s (after dilution to 50% by weight with monobutyl glycol ether, at 25° C.)

Amine number: 74 mg KOH/g of solids.

Base-resin A 4:

To 2167 g of a 75% solution of technical xylene of a bis-phenol A-based epoxy-resin, with an epoxy-equivalent of 612, is added 3 g of triphenylphosphine, and the mixture is heated to a temperature between 140° and 150° C. in order to eliminate any water present. After cooling to a temperature between 70° and 80° C., 550 g of an adduct made from one mol of n-hexane-1,6-diamine and 2 mol of versatic acid glycidyl ester is added during about 30 minutes, and the mixture is then held at 70° C. for one hour. Next, 280 g of an 87.8% solution of methylaminopropylamine monobutylaldimine in isobutyraldehyde is added during 15 minutes. The reaction temperature first rises to approximately 95° C. and then falls again to 80° C.; the solution is kept at the latter temperature for another 2 hours. After addition of 1038 g of monobutyl glycol ether, the excess of isobutyraldehyde and of xylene is distilled off in vacuo.

Solids: 74.5% by weight (40 min. at 180° C.)

Viscosity: 1.5 Pa s (after dilution to 50% by weight with monobutyl glycol ether, at 25° C.)

Amine number: 118 mg KOH/g of solids

Cross-linking agent B1 (Component B):

A quantity of 569.6 g of a biuret-group-containing aliphatic tri-isocyanate, based upon hexamethylene di-isocyanate, is dissolved in 96 g of anhydrous ethyl glycol acetate; the solution is heated to 80° C. A quantity of 236 g of anhydrous lactic acid ethyl ester is added dropwise during 25 minutes, the mixture is kept at 80° C. for 30 minutes, and then 59 g of methyl diethanolamine is added during 10 minutes. Decantation is carried out after 2 hours at 80° C.

Theoretical solids: approx. 90% by weight

Ester number (calculated): 130 mg KOH/g of solid resin

Amine number: 32 mg KOH/g of solid resin

Cross-linking agent B 2 (Component B):

A quantity of 1851 g of trimellitic acid anhydride and 1344 g of lactic acid ethyl ester are heated at 200° C. during 1 hour while being well stirred under inert gas; this temperature is maintained until an acid number of 363 is measured.

A quantity of 450 g of this acidic polycarboxylic acid ester is cooled to 140° C., and 698 of the glycidyl ester of versatic acid is added during about 15 minutes. Then the mixture is kept at 140° to 150° C. until the acid number becomes less than 1.

Theoretical solids [content]: approx. 97% by weight

Ester number (calculated): approx. 70 mg KOH/g solid resin.

Cross-linking agent B 3:

A quantity of 1018 g of pyromellitic acid dianhydride is heated with 551 g of anhydrous lactic acid ethyl ester until a clear reaction product is obtained, and the mixture is kept at 180° C. until the acid number has attained a value of 476. Then the mixture is cooled to 80° C., 4 g of dimethylbenzylamine is added, and 2427 g of versatic acid glycidyl ester is added during 1 hour, the temperature rising temporarily up to 190° C. during this stage. The mixture is kept at 140° C. until the acid number has attained a value of about 2, and is then diluted with 470 g of ethyl glycol.

Solids: 80.8% by weight (40 min. at 180° C.)

Viscosity: 0.7 Pa s (after dilution to 60% by weight with monobutyl glycol ether, at 25° C.)

Ester number (calculated): 65 mg KOH/g of solid resin.

Cross-linking agent B 4:

A quantity of 750 g of pyromellitic acid tetraethyl ester, still showing a residual acid number of 46, is esterified with 186 g of neopentyl glycol at a temperature which rises slowly from 220° to 300° C.; 148 g of distillate (ethanol) passed over during the operation.

Acid number: 36 mg KOH/g of solids

Viscosity: 246 mPa s (after dilution to 60% by weight with monobutyl glycol ether, at 25° C.)

Ester number (calculated): 415 mg KOH/g of solids.

EXAMPLE 1

(a) Pre-condensate:

A weight of 1478 g of the base-resin A 1 is mixed with 75 g of the base-resin A 2 and with 448 g of the cross-linking agent B 1; the mixture is heated under nitrogen and with thorough stirring to the reflux temperature (about 116° C.) and is pre-condensed for two hours at this temperature.

Viscosity: 1.8 Pa s (after dilution to 50% by weight with monobutyl glycol ether, at 25° C.)

Solids: 75.4% by weight (heating for 40 minutes to 180° C. in circulating-air oven).

(b) Deposition bath:

A weight of 265 g of the pre-condensate is mixed with 4.8 g of acetic acid and with 1.7 g of iron(III)acetylacetonate, and the mixture is gradually diluted with 1728 g of water to a solids content of about 10% by weight.

'MEQ'-acid: approx. 40 pH-value: 6.7

Specific electrical conductance of bath: 1030 μS cm$^{-1}$ (The term 'MEQ-acid' means the number of milliequivalents of amine per 100 g of solid resin).

No precipitation phenomena or phase separations occur upon standing of the bath.

The films are deposited during 2 minutes at a bath temperature of 30° C. on Bonder 127, then rinsed off with water and baked for 25 minutes at 160° C.

Deposition voltage: 150 V for a dry-film thickness of 20 μm

Pendulum hardness after
König (DIN 53 157): 210/213 seconds
Bending test: satisfactory
Salt-spray test after
DIN 50 021
144 hr. on bright sheet: 1.5 to 2.5 mm under diffusion
360 hr. on Bonder 127: 2 to 3 mm under diffusion Comparison trial 1

With 184 g of base-resin A 1 are mixed 44.5 g of cross-linking agent B 1, 188 g of a 16.9% paste of base-resin A 2 (this paste is made from 750 g of base-resin A 2, 375 of monobutyl glycol ether, 31 g of acetic acid and 3843 g of water), 1.7 g iron(III)acetylacetonate and 7.2 g of glacial acetic acid, and the mixture is gradually diluted with 1645 g of water to a solids content of about 10% by weight.

'MEQ'-acid: approx 60
pH-value: 6.2
Specific electrical conductance of bath: 1 300 μS cm$^{-1}$ On letting the bath stand, a bottom sediment becomes deposited in 24 hr.; skin-like formations may also occasionally separate out at the surface.

The films are deposited on Bonder 127 L during 2 minutes at a bath temperature of 30° C., are rinsed off with water and baked on for 25 minutes at 160° C.

Deposition voltage: 220 V for 18 to 20 μm dry-film thickness

Pendulum hardness after König (DIN 53 157): 210/213 seconds
Bending test: satisfactory
Salt-spray test according to DIN 50 021:
144 hr. on bright sheet: 2 to 3 mm under diffusion
360 hr. on Bonder 127 L: 1.5 to 2 mm under diffusion

EXAMPLE 2

(a) Pre-condensate:

A weight of 671 g of the base-resin A 1 (solids=74.5% by weight) and 71 g of the base-resin A 2 are mixed with 143 g of the cross-linking agent B 2; the mixture is heated to 95° C. under nitrogen and with stirring and is pre-condensed at this temperature for 2 hours.

Viscosity: 3.9 Pa s (after dilution to 50% by weight with monobutyl glycol ether, at 25° C.)
Solids: 77.5% by weight (heating for 40 minutes to 180° C. in circulating-air oven)

(b) Deposition bath:

A weight of 258 g of the pre-condensate is mixed with 6.0 g of glacial acetic acid and 1.7 g of iron(III)acetylacetonate, and the mixture is gradually diluted with 1734 g of deionized water to a solids content of about 10% by weight.

'MEQ'-acid: about 50
pH value: 5.9
Specific electrical conductance of bath: 1.025 μS cm$^{-1}$ No precipitation phenomena occur upon letting the bath stand. The films are deposited on Bonder 127 during 2 minutes at a bath temperature of 30° C., are rinsed off with water and baked for 25 minutes at 160° C.

Deposition voltage: 250 V for 16 μm dry-film thickness

Pendulum hardness after König (DIN 53 157): 231/232 seconds
Bending test: satisfactory.

EXAMPLE 3

(a) Pre-condensate:

A quantity of 769 g of the base-resin A 3 is mixed with 231 g of cross-linking agent B 1 and with 207 g of monobutyl glycol ether, the mixture is heated for 3 hours at 60° C. with stirring and under inert gas.

Solids: 59.9% by weight (40 min. at 180° C.)
Viscosity: 4.9 Pa s (after dilution to 50% by weight with monobutyl glycol ether, at 25° C.)

(b) Deposition bath:

A quantity of 334 g of the pre-condensate is mixed with 1.7 g of iron(III) acetylacetonate and with 7.2 g of glacial acetic acid; the mixture is gradually diluted with water to a solids content of approximately 10% by weight.

'MEQ'-acid: approx. 60
pH-value: 6.6
Specific electrical conductance of the bath: 1 577 μS cm$^{-1}$ No precipitation phenomena appeared when the bath was allowed to stand. The films were deposited during 2 minutes at a bath temperature of 30° C. upon a phosphatized sheet (Bonder 127, from the firm Metallgesellschaft, West Germany). The films were rinsed down with water and baked for 25 minutes at 160° C.

Deposition voltage: 150 V for a dry-film thickness of 20 μm

Pendulum hardness (DIN 53 157): 88 seconds
Erichsen cupping (DIN 53 156) 9.5 mm.

EXAMPLE 4

(a) Pre-condensate:

A quantity of 796 g of the base resin A 3 is mixed with 204 g of cross-linking agent B 3 and with 250 g of monobutyl glycol ether; the mixture is heated at 60° C. for 3 hours, with stirring and under inert gas.

Solids: 59.0% by weight (40 min. at 180° C.)
Viscosity: 6.7 Pa s (after dilution to 50% by weight with monobutyl glycol ether, at 25° C.)

(b) Deposition bath:

A quantity of 338.5 g of the pre-condensate is mixed with 6 g of lead octoate and with 7.2 g of glacial acetic acid; the mixture is gradually diluted with water to a solids content of about 10% by weight.

'MEQ'-acid: about 60
pH-value: 5.95
Specific electrical conductance of the bath: 1 496 μS cm$^{-1}$ No precipitation phenomena occur when the bath is allowed to stand. The films are deposited during 2 minutes at a bath temperature of 30° C. upon phosphatized sheets (Bonder 127 from the firm Metallgesellschaft); they are rinsed down with water and are baked for 2 minutes at 160° C.

Deposition voltage: 110 V for a dry-film thickness of 20 μm

Pendulum hardness (DIN 53 157): 154 seconds
Erichsen cupping (DIN 53 156): 10.7 mm.

EXAMPLE 5

(a) Pre-condensate:

With 600 g of base-resin A 4 there was mixed 162.6 g of the cross-linking agent B 1 which, after distilling off of ethylacetate, had been additionaly diluted with butyl glycol to a solids content of 69% by weight and 33.7 g of butyl glycol was also added to the mixture. Then the mixture was heated rapidly to 80° C. and thereafter from 80° C. to 120° C. over 4 hours, 30 minutes after that, the mixture was cooled.

Solids: 68.8% by weight (40 min. at 180° C.)

Viscosity: 2.4 Pa s (after dilution to 50% by weight with monobutyl glycol ether at 25° C.)

(b) Deposition bath:

A quantity of 349 g of the pre-condensate was mixed with 2 g of iron (III)acetylacetonate, 6.7 g of lead octoate and 7.2 g of glacial acetic acid; the mixture was gradually diluted with water to a solids content of about 12% by weight.

'MEQ'-acid: about 50 pH-value: 6.4

Specific electrical conductance of the bath: 1 610 µS cm$^{-1}$

No precipitation phenomena occurred when the bath was allowed to stand. The films were deposited during 2 minutes at a bath temperature of 30° C. upon phosphatized sheets (Bonder 127 from the Metallgesellschaft); they were rinsed down with water and baked for 25 minutes at 180° C.

Deposition voltage: 170 V for a dry-film thickness of 18–19 µm

Pendulum hardness (DIN 53 157): 213 seconds

Erichsen cupping (DIN 53 156): 9.0 mm.

EXAMPLE 6

(a) Pre-condensate:

A quantity of 600 g of base-resin A 4 was mixed with 112 g of cross-linking agent B 4 and with 67 g of butyl glycol; after the mixture had been heated up slowly to 150° C., it was kept for two hours at that temperature.

Solids: 75.4% by weight (40 min. at 180° C.)

Viscosity: 3.1 Pa s (after dilution to 50% by weight with monobutyl glycol ether, at 25° C.)

(b) Deposition bath:

A quantity of 318 g of the pre-condensate was mixed with 2 g of iron(III)acetylacetonate, 6.7 g of lead octoate and 7.2 g of glacial acetic acid; the mixture was gradually diluted with water to a solids content of about 12% by weight.

'MEQ'-acid: about 50 pH-value: 5.3

Specific electrical conductance of the bath: 1 240 µS cm$^{-1}$

No precipitation phenomena occurred when the bath was allowed to stand. The films were deposited during 2 minutes at a bath temperature of 30° C. upon phosphatized sheets (Bonder 127 from the Metallgesellschaft); they were rinsed down with water and were baked for 25 minutes at 180° C.

Deposition voltage: 240 V for a dry-film thickness of 20 µm

Pendulum hardness (DIN 53 157): 200 seconds

Erichsen cupping (DIN 53 156): 9.3 mm.

We claim:

1. A binding agent which is water-dilutable upon protonization with acids, for a pre-condensed, thermosetting aqueous lacquer coating material, said binding agent comprising:
   (a) a water-dilutable pre-condensation product having a mean molecular weight (Mn) of about 800 to 15,000 obtainable by heating a first component including a quantity of 55% to 95% by weight, based on the total quantity of the binding agent of an organic synthetic-resin binder containing amino groups and having an amine number of about 30 to 150, and a second component including a quantity of 5% to 45% by weight of a cross-linking agent containing terminal carboxyl groups, the latter being esterified with mono-alcohols in such proportion as will cause the pre-condensate to have an ester number of at least about 30, the ester groups being largely stable in a neutral aqueous medium yet being reactive towards primary and/or secondary amino groups of the synthetic-resin binder in a basic medium at temperatures above about 140° C. to cross link the binding agent by amidation,
   (b) said first and second components being heated to temperatures of between 50° and 200° C. for such length of time that, after protonization with acid and dilution with water for the purpose of preparing a lacquer, it shows no precipitation phenomena.

2. Binding agent according to claim 1, characterized in that the pre-condensation product has been obtained by heating said first and second components up to between 80° and 150° C.

3. Binding agent according to claim 2, characterized in that the pre-condensation product has been obtained by heating for from 1 to 5 hours.

4. Binding agent according to claim 1, characterized in that the pre-condensation product has been obtained by heating of the first and second components in a 60 to 95 percent-by-weight solution in organic solvents.

5. Binding agent according to claim 1, characterized in that the pre-condensation product has been obtained by heating until a 50 percent-by-weight solution of the pre-condensation product in monobutyl glycol ether shows a viscosity, measured at 25° C., of 0.5 to 10 Pas.

6. Binding agent according to claim 4, characterized in that said organic solvents are aliphatic alcohols with 1 to 6 carbon atoms or their monoglycol ethers.

7. Binding agent according to claim 6, characterized in that said organic solvents are aliphatic alcohols with 2 to 4 carbon atoms or their monoglycol ethers.

8. Binding agent according to claim 1, characterized in that the synthetic resin binding agent is selected from the group consisting of
   (a) polyamides and
   (b) a reaction product of (i) epoxide-group or isocyanate group containing compounds having a molecular weight greater than 300 with (ii) hydroxy or amino group containing aldimines, ketimines or aliphatic diamines where substantially all of the epoxy and isocyanate groups are reacted with one molecule of aldimine, ketimine or diamine.

9. Binding agent according to claim 1, characterized in that the cross-linking agent is selected from the group consisting of
   (a) polyester and
   (b) a reaction product of (i) epoxide-group-containing or isocyanate-group-containing compounds having a molecular weight above 300 with (ii) (A) esters of hydroxyl group containing carboxylic acids and/or aminoalkyl esters or with (ii) (B) acidic polycarboxylic acid esters.

10. Binding agent according to claim 9, characterized in that the cross-linking agent shows a molecular weight of at least 500.

11. Binding agent according to claim 9, characterized in that the cross-linking agent contains from 2 to 6 terminal carboxyl groups, said carboxyl groups being at least partially esterified.

12. Binding agent according to claim 11, characterized in that at least 80 equivalent-% of the terminal carboxyl groups of the second component are esterified.

13. Binding agent according to claim 12, characterized in that substantially all of the terminal carboxyl groups are esterified.

14. Binding agent according to claim 11, characterized in that the terminal carboxyl groups of the cross-linking agent are esterified preponderantly with alcohols having a boiling point below 140° C.

15. Binding agent according to claim 14, characterized in that the terminal carboxyl groups of the cross-linking agent are esterified preponderantly with primary alcohols.

16. Binding agent according to claim 14, characterized in that the terminal carboxyl groups of the second component are esterified preponderantly with lower aliphatic alcohols.

17. Binding agent according to claim 1, characterized in that the second component has an amine number of between 0 to 60.

* * * * *